H. S. MILLS.
PHONOGRAPH MACHINE.
APPLICATION FILED FEB. 27, 1905.

929,775.

Patented Aug. 3, 1909.
10 SHEETS—SHEET 1.

Witnesses:

Inventor:
Herbert S. Mills,
By Dyrenforth, Dyrenforth & Lee,
Attys.

UNITED STATES PATENT OFFICE.

HERBERT S. MILLS, OF CHICAGO, ILLINOIS.

PHONOGRAPH-MACHINE.

No. 929,775.          Specification of Letters Patent.          Patented Aug. 3, 1909.

Application filed February 27, 1905. Serial No. 247,492.

*To all whom it may concern:*

Be it known that I, HERBERT S. MILLS, a citizen of the United States, residing at Chicago, in the county of Cook and State of Illinois, have invented a new and useful Improvement in Phonograph - Machines, of which the following is a specification.

My invention relates particularly to machines employing an electric motor for motive purposes, although the invention is applicable to machines employing any other form of motor as a primary source of power.

My primary object is to provide a machine wherein provision is made for winding the spring which serves to actuate the record of a phonograph by means of a motor which will operate for a predetermined period of time, when set in motion, thereby to give to the spring serving to actuate the record a predetermined tension.

In the accompanying drawings, my invention is shown embodied in a combined picture exhibiting and phonograph machine, the phonograph being of a well known type employing a disk-form record.

In the drawings Fig. 1ᵃ, a detail of a vibrative counteracting device employed in connection with a stop-actuating lever, which lever may be actuated by a coin or in any other suitable way.

In the construction illustrated, A represents a casing which may be of any suitable design and which preferably has an upper compartment $A^1$ and a lower compartment $A^2$; B, a picture exhibiting device which may be of any approved construction and which is mounted in the chamber $A^1$; C, a phonograph and mechanism connected therewith located in the chamber $A^2$; K, the eyepiece of the machine; and L, the trumpets, or ear-pieces, of the machine.

Where the machine is coin-controlled, as illustrated, the casing A may be equipped with a coin-chute $a$, which terminates adjacent to the mechanism C in an enlargement $a^1$, which is provided at its front wall with a slot $a^2$ into which projects the free end of the stop-actuating lever mentioned above. Coacting with said stop-actuating lever is a weighted spring-held lever $a^3$ (Fig. 1ᵃ), the purpose of which will be explained presently.

Figures 1, 1A:
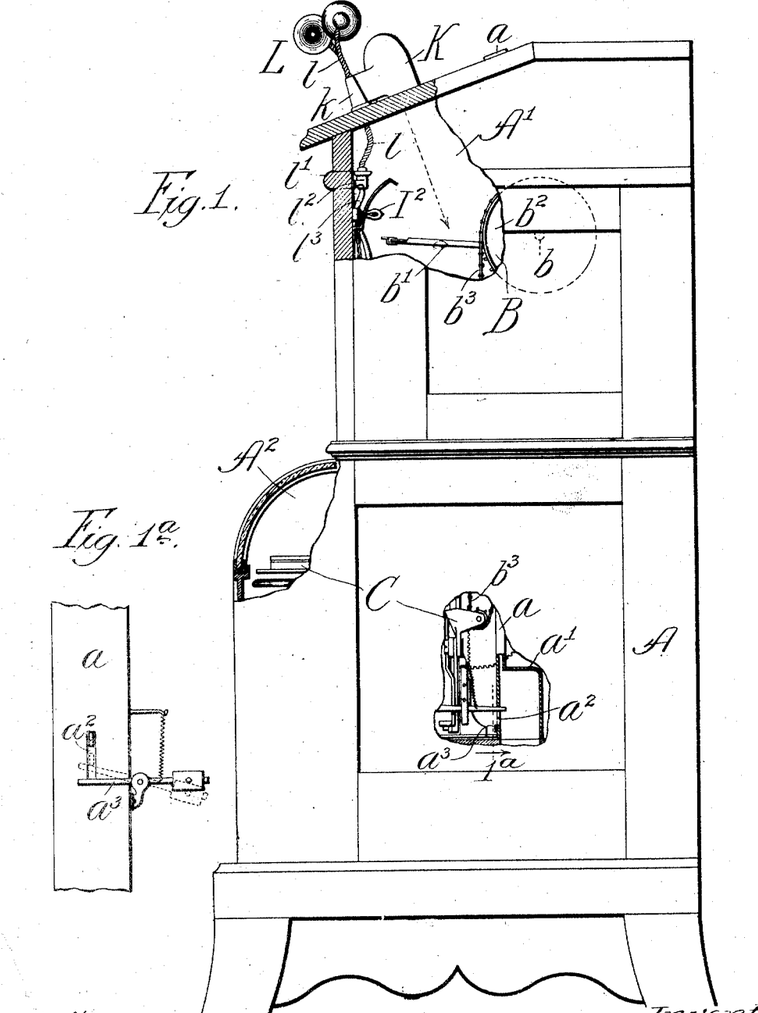
—Figure 1 represents a side elevational view of my improved machine, portions of the casing being broken away to expose a part of the picture exhibiting device and portions of the phonograph.

As stated, the picture exhibiting mechanism B may be of any desirable known construction. In Fig. 1, $b$ represents the shaft (dotted) of this mechanism, and $b^1$ one of the picture-carrying arms thereof. The shaft $b$ is equipped with a sprocket-wheel $b^2$ which is connected by a sprocket-chain $b^3$ with the mechanism C.

Figure 4:
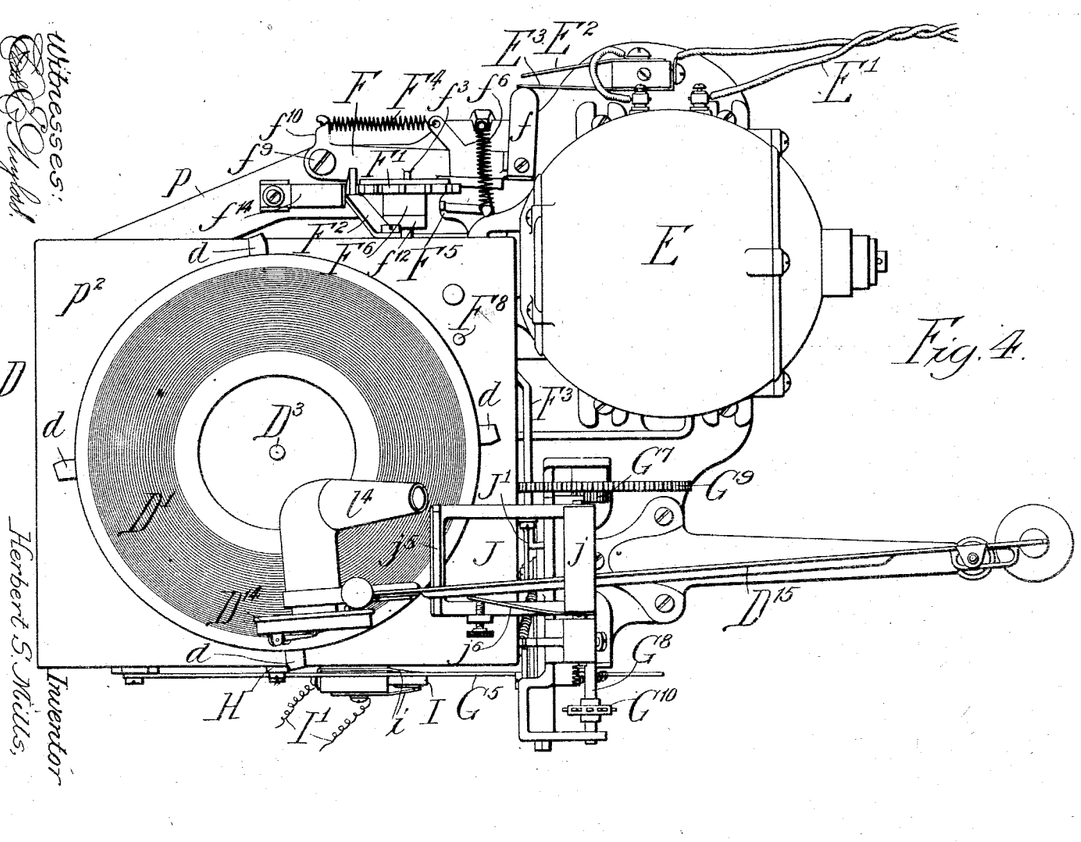
Fig. 4, a plan view of the same.
Figure 5:
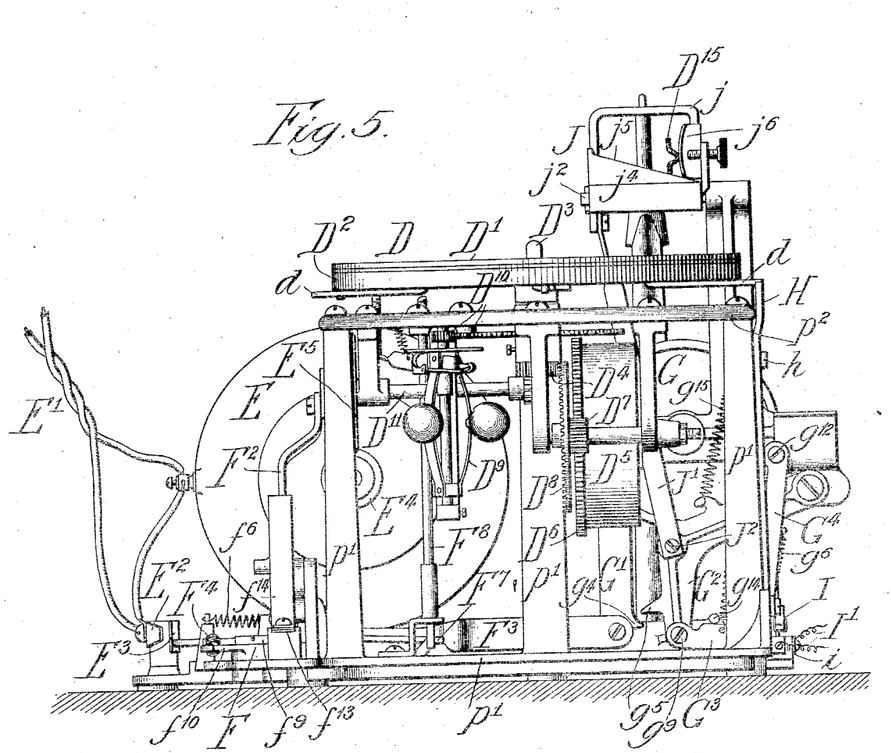
Fig. 5, a front view of the same.
Figure 6:
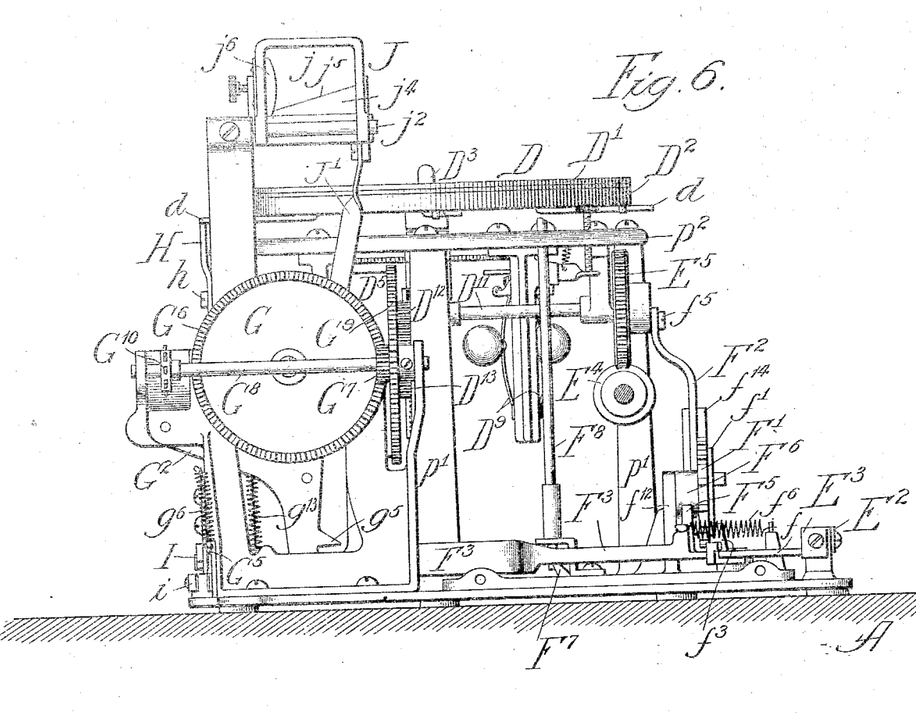
Fig. 6, a rear view of the same.
Figure 7:
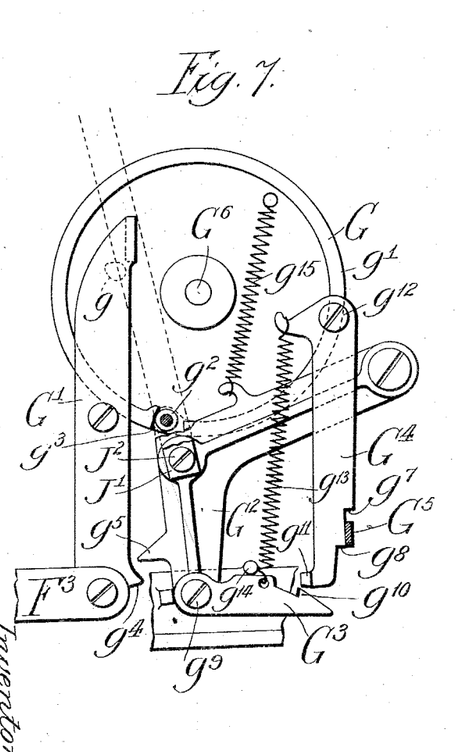
Fig. 7, a broken section taken as indicated at line 7 of Fig. 2, showing a controlling wheel which serves to control the circuit of the electric motor shown and the stop-actuating lever mentioned, said view showing also the operative parts adjacent to said wheel.
Figure 8:
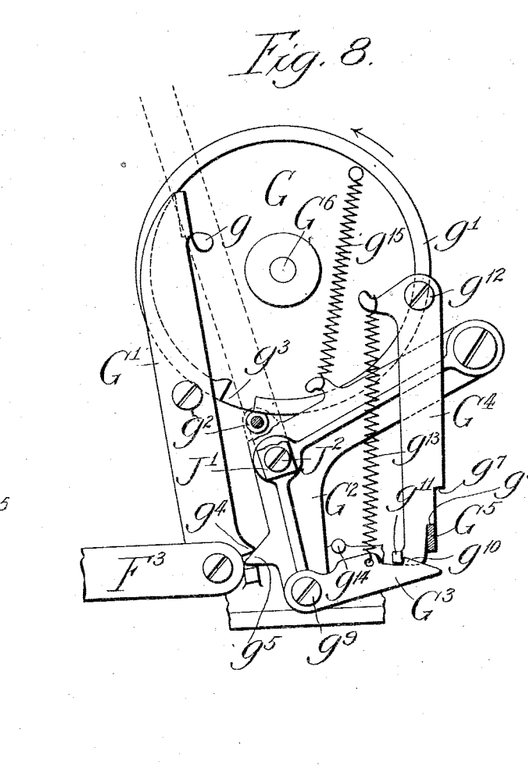
Fig. 8, a similar view showing a different position of the parts.
Figures 9, 10:
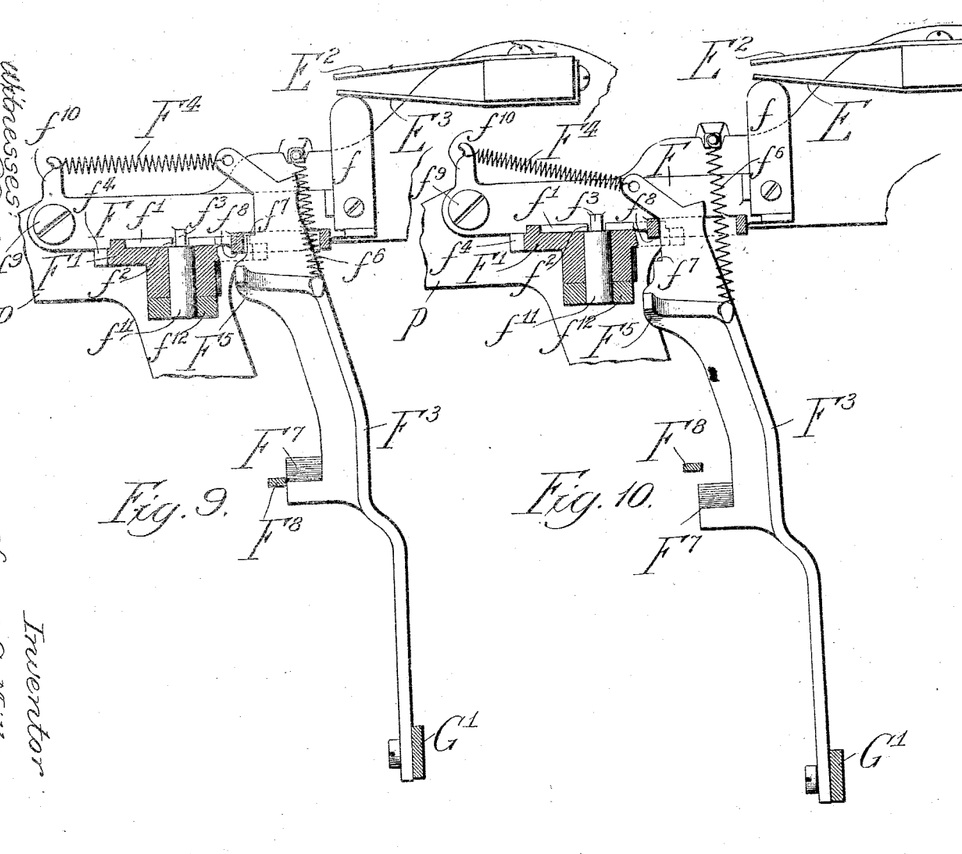
Fig. 9, a broken sectional view taken as indicated at line 9 of Fig. 3 and showing the construction at and adjacent to the contacts of the motor circuit.
Fig. 10, a similar view showing the parts in a different position.
Figure 11:
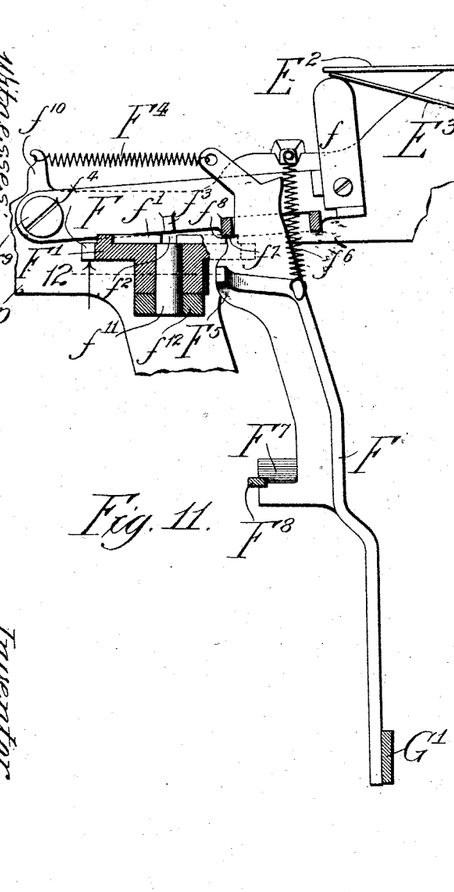
Fig. 11, a similar view showing the parts in still another position.

The mechanism C comprises a phonograph D of known general construction having a disk-form record $D^1$, a record-bearing disk $D^2$, a record-actuating shaft $D^3$ actuated by a pinion $D^4$, a cylinder $D^5$ equipped with the usual spring (not shown) and with a gear $D^6$, a pinion $D^7$ driven by the gear $D^6$ and in turn driving a gear $D^8$ meshing with the pinion $D^4$, a governor $D^9$ actuated by gears $D^{10}$ from the shaft $D^3$, a horizontal winding shaft $D^{11}$ equipped (Fig. 6) with a pinion $D^{12}$ meshing with a pinion $D^{13}$ through the medium of which the spring is wound in the usual manner, and a reproducer $D^{14}$ mounted upon an arm $D^{15}$ and coöperating with the record $D^1$; an electric motor E in an electric circuit $E^1$ energized from any suitable source and equipped with normally separated contact members $E^2$, $E^3$; a worm $E^4$ on the shaft of the motor E and meshing with a worm-wheel $E^5$ secured on the winding-shaft $D^{11}$; a contact-actuating lever F (Figs. 4, 9, 10 and 11), equipped with an insulation finger $f$ against which the contact $E^3$ bears; a controlling-wheel $F^1$ for the lever F bearing a lateral annular flange $f^1$ provided with a notch $f^2$ adapted to receive a lug $f^3$ on the lever F, said wheel being provided peripherally with ratchet-teeth $f^4$; a spring-held actuating pawl $F^2$ joined by a pivot $f^5$ to the wheel $E^5$ and serving to actuate the wheel $F^1$; a spring-actuated cam-retracted member $F^3$ through the medium of which the member F is actuated in the operation of closing the motor circuit, the member $F^3$ being actuated by a spring $f^6$ in said closing operation; a spring $F^4$ tending normally to pull the free end of the member $F^3$ forward, so that when said member is withdrawn by the controlling-wheel, which will be later described, a shoulder $f^7$ will engage a shoulder $f^8$ on the lever F, thereby to effect movement of the lever F when the member $F^3$ returns under the action of its spring; a cam $F^5$ (Figs. 6, 12 and 13), on the member $F^3$ with which engages a cam $F^6$ formed integrally with the wheel $F^1$, whereby the free end of the member $F^3$ is forced rearwardly after the wheel $F^1$ starts to rotate and the lug $f^3$ is engaged by the flange $f^1$ of the wheel; a stop-actuating cam $F^7$ on the member $F^3$ which serves to elevate a stop $F^8$ whose upper end will thus be brought into the path of stops on the record-supporting plate $D^2$; a wheel G (Figs. 7 and 8), serving through the medium of a lever $G^1$ to withdraw the member $F^3$ against the tension of its spring at the proper time, and serving also through the medium of a lever $G^2$ and a pawl $G^3$ to withdraw the latch $G^4$ of a stop-actuating lever $G^5$; a gear $G^6$ formed integrally with the wheel G and actuated by a pinion $G^7$ secured on a shaft $G^8$ and equipped with a gear $G^9$ which meshes with the gear $D^6$, by which it is actuated; a sprocket-wheel $G^{10}$ on the shaft $G^8$ and which actuates the sprocket-chain $b^3$ connected with the picture exhibiting mechanism; a stop H connected with the lever $G^5$ (Figs. 1 and 4), which stop co-acts with stops on the record-supporting disk $D^2$; a circuit-closing member I carried by the lever $G^5$ and adapted to close the circuit $I^1$ of an electric light $I^2$, which serves to illuminate the pictures; and a pivotally supported reproducer-shifter J connected by a member $J^1$ (Fig. 5) with a stud $J^2$ carried by the elbow of the lever $G^2$ (Fig. 8).

Figures 15, 16, 17, 18, 19:
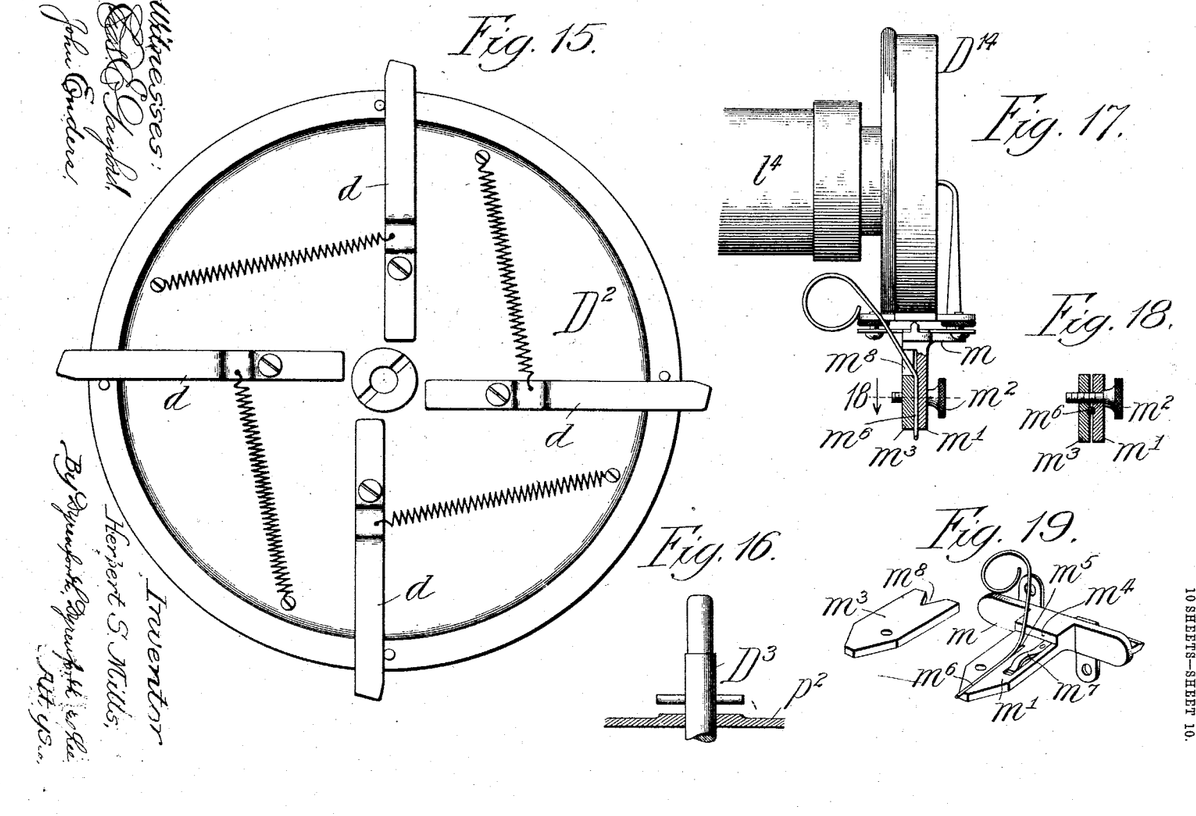
Fig. 15, a bottom plan view of the record-carrying disk showing the yielding stops thereon adapted to engage with the stop actuated by the lever mentioned above.
Fig. 16, a detail of the record-actuating shaft.
Fig. 17, a broken sectional view showing a detail of the phonograph stylus, the section being taken as indicated at line 17 of Fig. 2.
Fig. 18, a section taken as indicated at line 18 of Fig. 17.
Fig. 19, a perspective view of the stylus-holder with the clamping-jaws thereof separated.

The general construction of the phonograph D need not be described more at length. The record $D^1$ and its supporting plate $D^2$ are readily removable from the shaft $D^3$. For the purposes of the present invention, I have provided the member $D^2$, on its lower side, with yielding substantially radial stops $d$, whose outer ends project somewhat beyond the circumference of the disk, as shown in Fig. 15. These stops may be engaged by either or both of the stops $F^8$ and H. The function of the stop H is to control the movement of the record of the phonograph in ordinary use; and, in coin-controlled machines, the stop H is actuated ordinarily by a coin through the medium of the lever $G^5$. The function of the stop $F^8$ is to prevent further rotation of the record, after the machine has once operated, until the motor has been set in operation to re-wind the spring of the phonograph, whereby a desirable tension is always maintained on the phonograph spring, the spring never being allowed to run down. The worm driven wheel $E^5$ takes the place of the winding key of the ordinary manually wound phonograph of this type.

The motor circuit may be provided with a fuse (none shown). The contacts $E^2$, $E^3$ preferably comprise two normally separated spring-metal members, the member $E^3$ being capable of being forced into engagement with the member $E^2$ and returning under its own resiliency to the open position.

The contact-actuating member F is equipped near its pivot $f^9$ with a short arm $f^{10}$, and the spring $F^4$ joins the arm $f^{10}$ to the free end of the member $F^3$. Thus, it will be understood that the lug $f^3$ tends normally to enter the recess $f^2$ in the flange $f^1$ of the wheel $F^1$. The wheel $F^1$ is mounted on a stud $f^{11}$ carried by a frame member $f^{12}$. The wheel $F^1$ is guarded against retrograde movement by a spring $f^{13}$. The pawl $F^2$ is held in engagement with the ratchet-teeth $f^4$ by a spring $f^{14}$.

Figure 2:
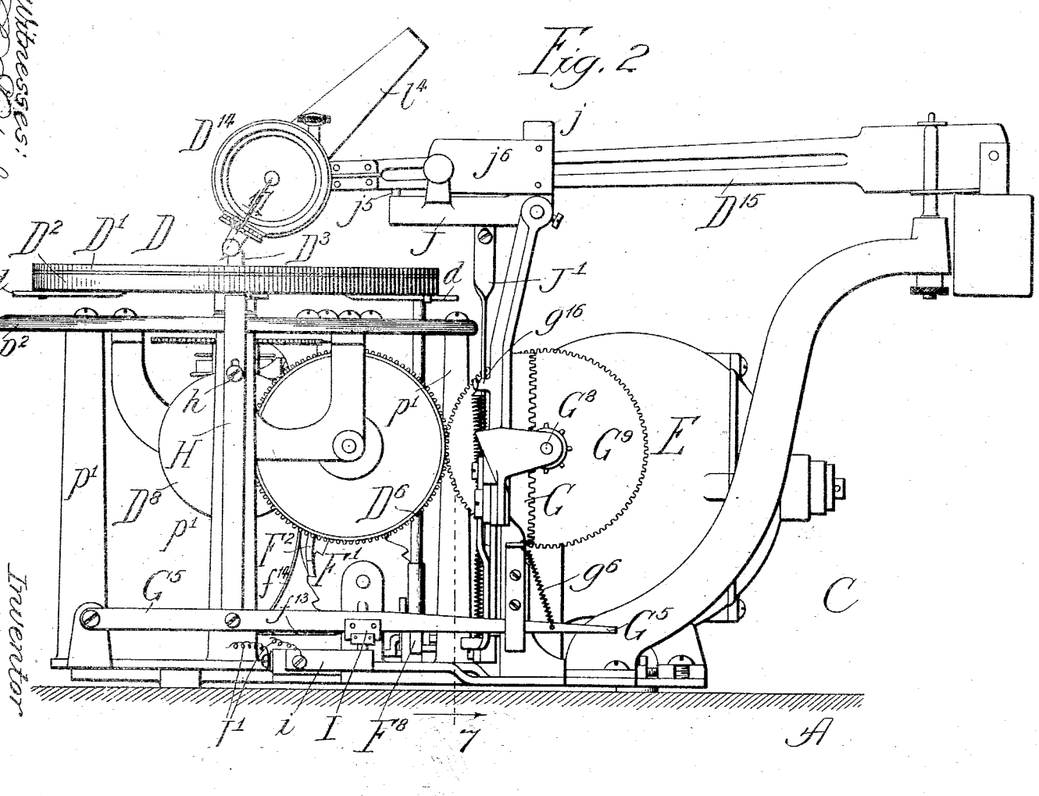
Fig. 2, a side elevational view of the phonograph and the mechanism connected therewith, shown as removed from the casing.
Figure 3:
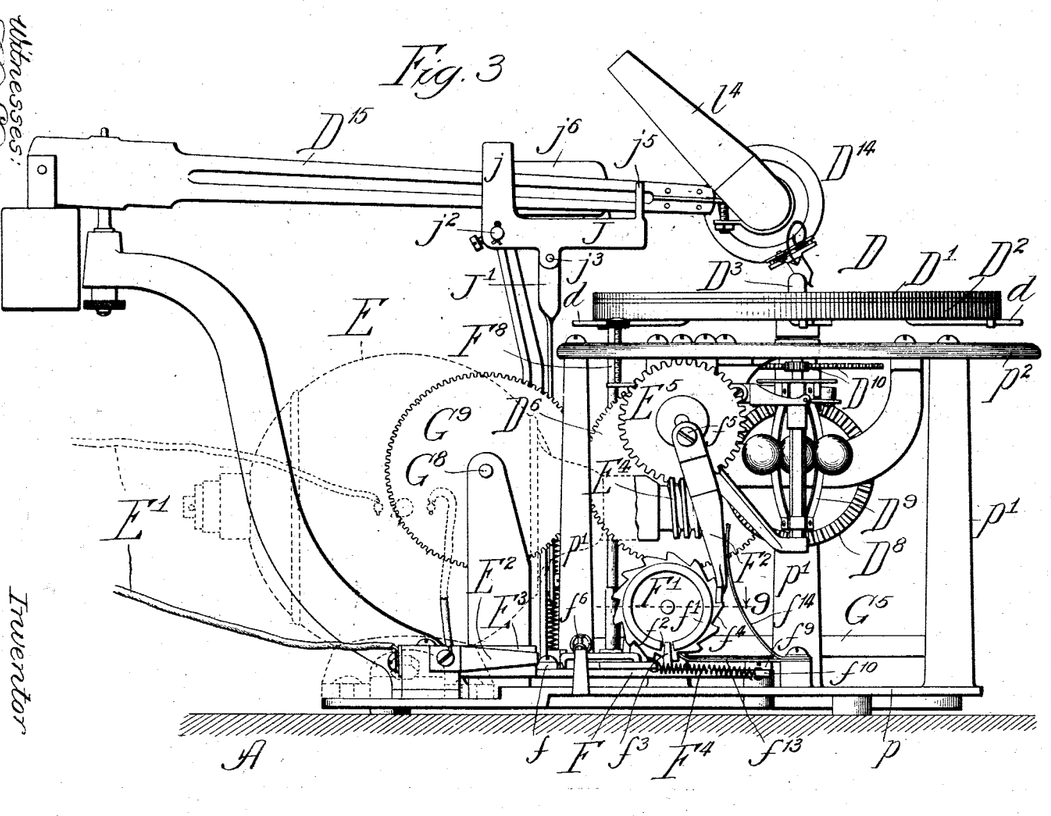
Fig. 3, a reverse side elevational view of the same.

The wheel G is provided on its front surface with a cam-lug $g$ adapted to engage the upper end of the lever $G^1$ and actuate said lever during each revolution of the wheel G. The parts are so timed that the wheel G makes one revolution by about the time the record has been completely traversed by the stylus of the reproducer. When the lever $G^1$ is relieved from the action of the cam-lug $g$, the member $F^3$ is permitted to return under the action of its spring and close the motor circuit. The wheel G has a smooth circumferential surface $g^1$, upon which rides a roller $g^2$ carried by the member $G^2$, the periphery of the wheel being provided with a recess $g^3$ which the roller may enter after the wheel completes its revolution. The parts are timed so that the roller will enter the recess $g^3$ an instant before the cam-lug $g$ releases the lever $G^1$, and the lower end of the lever $G^1$ is provided with a locking shoulder $g^4$ which engages a shoulder $g^5$ with which the member $G^2$ is provided, so that, although the wheel G may allow the member $G^2$ to rise slightly before the member $G^1$ is released from the lug $g$, this action nevertheless will not be permitted to occur until after movement of the lever $G^1$. The lever $G^5$ has its free end held normally elevated by a spring $g^6$, as shown in Fig. 2. The latch $G^4$ is provided with a locking shoulder $g^7$, which corresponds with the elevated position of the lever $G^5$, and a locking shoulder $g^8$, which corresponds with the depressed position of said lever. The pawl $G^3$ is connected by a pivot $g^9$ with the lever $G^2$, and is provided with a hook $g^{10}$ adapted to engage a lug $g^{11}$ with which the locking pawl $G^4$ is provided. The pawl $G^4$ is supported from the frame on a pivot $g^{12}$ and is provided with a short arm connected by a spring $g^{13}$ with the pawl $G^3$, whereby the tendency of the lower end of the pawl $G^4$ is to move outwardly and the tendency of the free end of the pawl $G^3$ is to move upwardly. On the frame is provided a stop $g^{14}$ which is engaged by the pawl $G^3$ to cause it to release its hold upon the pawl $G^4$ during the upward movement of the free end of the lever $G^2$. The purpose of this action is to permit the pawl $G^4$ to assume its normal condition in readiness to lock the lever $G^5$ when the latter is again depressed. The spring $g^{15}$ connected with the lever $G^2$ and with a projection $g^{16}$ (Fig. 2) on a frame member tends normally to elevate the free end of said lever.

The stop H comprises a vertically movable bar provided with a slot through which passes a stud $h$ supported by the frame.

The circuit-closing member I is adapted to be forced between contact members $i$ in the circuit $I^1$, when the lever I is depressed, so that the light $I^2$ will be turned on at the moment the phonograph starts to operate.

The reproducer-shifter J comprises a frame $j$ supported on a horizontal pivot $j^2$, the member $J^1$ having pivotal connection $j^3$ with the member $j$ in front of the pivot $j^2$. The front portion of the member J is equipped with a cam $j^4$ having an inclined surface $j^5$ which tends normally to hold the arm $D^{15}$ of the reproducer over against an adjustable spring-stop $j^6$ at one side of the frame $j$, whereby the reproducer is held in a proper position to be lowered upon the record at its outer margin. When the stop-actuating lever $G^5$ is depressed and the spring-driven train of the phonograph allowed to operate the phonograph, the wheel G is caused to turn, owing to its connection with the driving-train of the phonograph, and the roller $g^2$ is forced out of the recess $g^3$ in said wheel, being moved from the position shown in Fig. 7 to the position shown in Fig. 8. This immediately depresses the front end of the reproducer-shifter, through the medium of the connecting member $J^1$, which is actuated by the lever $G^2$. During the revolution of the wheel G, the lever $G^2$ is held depressed, so that the cam $j^5$ is held out of the way of the arm $D^{15}$ until the reproducer has completed its travel across the record, whereupon, the lever $G^2$ rising, the cam $g^4$ is elevated, thereby raising the reproducer and causing it to shift back to its starting position with the arm $D^{15}$ raising against the yielding stop $j^6$.

Figures 12, 13, 14:
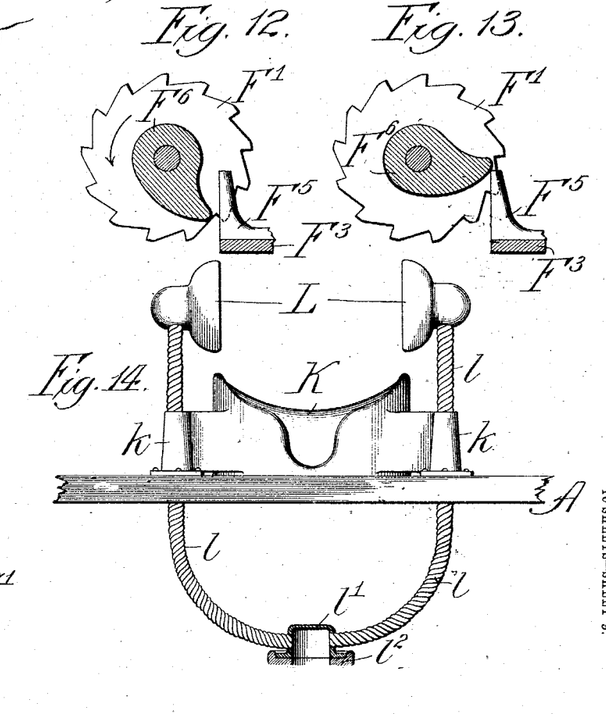
Fig. 12, a broken section taken as indicated at line 12 of Fig. 11.
Fig. 13, a similar view showing the parts in a different position.
Fig. 14, a detail of the eye and ear pieces of the machine.

The construction of the members K and L will be best understood by reference to Figs. 1 and 14. The eye-piece K is of the usual form for such purposes, and is provided with perforate lugs $k$ through which the flexible metallic tubes $l$ of the ear-trumpets extend. The tubes $l$ are joined to a cap-shaped piece $l^1$ which connects with a fixedly supported member $l^2$ carried by the frame and connected with a tube $l^3$, which in turn, is joined to the horn $l^4$ of the phonograph. The tubes $l$ slide freely through the perforate lugs $k$ and the corresponding holes in the casing, enabling the trumpets to be adjusted to the requirements of the persons using the machine.

A detail of the construction of the reproducer $D^{14}$ is shown in Figs. 17 to 19 inclusive. The reproducer-head is equipped with a bracket $m$ of the usual construction, except that it is provided with a jaw $m^1$ with which is connected, by means of a screw $m^2$ a removable jaw $m^3$. The free ends of the jaws are tapered, as shown. The base end of the jaw $m^3$ abuts against a shoulder $m^4$ with which the bracket $m$ is provided. A longitudinal channel $m^5$ in the jaw $m^1$ serves to receive the stylus wire $m^6$, and a spring $m^7$ serves to separate the jaws when the screw is upturned. The removable jaw $m^3$ is provided at its base end with a channel $m^8$ through which the rear end of the fine wire constituting the stylus projects. The stylus is thus firmly clamped between the jaws, and may be readily adjusted to compensate for wear, the rear portion of the wire serving as a means for forcing the wire through in the adjusting operation.

The frame which supports the phonograph and the winding-motor may be of any suitable construction. Preferably, it comprises integrally formed bottom members $p$ and standards $p^1$, the standards being surmounted by the usual top plate $p^2$ which supports the main portion of the mechanism of the phonograph proper and in which the record-actuating shaft $D^3$ is journaled.

The mode of operation may be briefly summarized thus: The motor E is preparatorily operated to give to the spring of the spring-driven train of the phonograph a desired tension, which tension is greater than is actually required to turn the record until the reproducer has fully traversed it, thereby insuring adequate power and a desirable rate of rotation of the record at all times. The motor circuit may be closed in any suitable way to effect the initial winding of the phonograph spring. The wheel $F^1$ is preparatorily adjusted so that after the spring of the phonograph has been preparatorily wound the notch $f^2$ receives the lug $f^3$ of the contact-shifter F, whereby the wheel $F^1$ is locked and the motor circuit left normally open. Assuming the friction-brake which constitutes a portion of the governor $D^9$ to be preparatorily set to control the rate of rotation of the record and the spring of the spring-motor of the phonograph to be properly wound, the lever $G^5$ may be depressed, as by means of a coin, thereby to withdraw the stop H and permit the record to turn. As soon as the record begins to turn, the wheel G driven from the spring-motor begins to turn also and depresses the lever $G^2$, thereby tilting the front end of the reproducer-shifter J downwardly and allowing the reproducer to drop until the stylus engages the record. As the wheel G nears the end of its revolution, the cam $g$ operates the lever $G^1$ and withdraws the member $F^3$ from the position shown in Fig. 9 to the position shown in Fig. 10, the spring $F^4$ operating at the same time to draw the free end of the member $F^3$ forwardly so that the shoulder $f^7$ will be in position to engage the shoulder $f^8$ upon the return movement of the member $F^3$. When the cam-stud $g$ releases the lever $G^1$ the spring $f^6$ returns the member $F^3$ to approximately its normal position, thereby forcing the member F outwardly and closing the motor circuit. In the movement of the member F the wheel $F^1$ is unlocked, and immediately the winding wheel $E^5$ is set in operation the pawl $F^2$ begins to turn the wheel $F^1$. The first effect of the movement of the wheel $F^1$ is to bring the flange $f^1$ along side the lug $f^3$ in readiness to prevent return of the member F until the wheel $F^1$ has completed a revolution. In the first movement of the wheel $F^1$, also, the cam $F^6$ engages the projection $F^5$ on the member $F^3$, thereby moving the free end of said member rearwardly and effecting its release from the member F. After this release of the member $F^3$ from the position shown in Fig. 11, the stop $F^8$ drops to the position shown in Fig. 9, where it forms a stop for the member $F^3$. It will be seen, therefore, that when the wheel $F^1$ completes its rotation the member F is free to swing inwardly until the lug $f^3$ has fully entered the recess $f^2$.

Returning now to the action which occurred when the wheel started to rotate, it should be stated that the effect of depressing the lever $G^2$ was to cause the pawl $G^3$ to interlock with the pawl $G^4$, and it will be seen, therefore, that when the wheel G completes its revolution and the roller $g^2$ enters the recess $g^3$ the pawl $G^4$ will be caused to release the lever $G^5$ (with which it made engagement when the lever $G^5$ was depressed), and an instant later the pawl $G^3$ will be caused to release the pawl $G^4$, leaving the latter free to engage the lever $G^5$ upon a subsequent depression thereof. It should be pointed out, also, that the stop $F^8$, which is normally depressed, and free from the path of the stops $d$ on the record-supporting disk, has its lower end engaged by the inclined surface of the cam $F^7$ when the member $F^3$ returns under the action of its spring to force the contact-actuating member F outwardly, and when the cam $F^6$ forces the free end of the member $F^3$ rearwardly the stop $F^8$ drops off the cam $F^7$ and occupies the position shown in Fig. 9. Thus, it will be seen that the stop $F^8$ is held in an elevated position preventing the rotation of the record, until the electric motor has started to re-wind the spring of the spring-motor, so that said spring is prevented from running down. It should be added, as is apparent from Fig. 15, any excessive winding of the spring of the spring-motor would be relieved by a rotation of the record, the stops $d$ yielding to pass the stop H, thereby preventing breakage. Moreover, the yielding of the stops $d$ breaks the shock which otherwise would occur when the record is stopped at the end of the operation.

Where a coin is depended upon for depressing the stop-actuating lever $G^5$, there is danger of the lever being lowered by jarring the machine, and in such case the lever $a^3$ is caused to vibrate in a manner to counteract the movement of the stop-actuating lever, thereby to prevent fraudulent use of the machine.

It will be obvious that many changes in details of construction within the spirit of my invention may be made, hence no undue limitation should be understood from the foregoing detailed description.

It is believed to be novel to employ what for the purpose of this application will be termed a primary motor, operated from any suitable source of power to wind a spring-motor, the primary motor being automatically set in operation by the action of the spring-motor, and operating to produce a predetermined winding effect upon the spring-motor and finally being automatically stopped. It is to be understood, therefore, that the appended claims are intended to cover the invention in its widest application, regardless of the particular use to which the invention may be put.

As is well understood, electric currents of the same nominal voltage vary at different plants throughout the country, so that an electric motor can not be used without great limitations for the direct actuation of a phonograph, the number of the rotations of the record in which must be subject to very little variation. Furthermore, the provision of means for quickly and readily winding the spring-motor of a phonograph of the type herein shown and for insuring the proper degree of winding is regarded as of great importance.

What I regard as new, and desire to secure by Letters Patent, is—

1. The combination with a phonograph having a spring-motor, of an element driven thereby, a stop co-acting with said element, an electric winding-motor having a circuit, circuit-controlling mechanism actuated by said spring-motor, and mechanism controlled from said spring-motor serving to withhold said stop for a predetermined period to permit rotation of said element, for the purpose set forth.

2. The combination with a phonograph having a spring-motor, of an electric winding-motor having a circuit, circuit-controlling mechanism actuated by said spring-motor, a record-stop, and a locking device for said record-stop controlled by said circuit-controlling mechanism, for the purpose set forth.

3. The combination with a phonograph having a disk-form record, a reproducer co-acting with said record and a spring-motor to actuate the record, of a winding-motor, a reproducer-shifter, and mechanism actuated by said spring-motor and serving to start and stop the winding motor and operate said reproducer-shifter, for the purpose set forth.

4. The combination with a phonograph having a spring-motor and a shiftable reproducer, of a winding-motor connected with said spring-motor, a reproducer-shifter, and a controlling-wheel operated by said spring-motor and controlling the winding-motor and actuating the reproducer-shifter, for the purpose set forth.

5. The combination with a phonograph having a reproducer and a spring-motor provided with a winding-shaft, of an electric winding-motor geared to said winding-shaft, a contact-controlling-wheel actuated with said winding-shaft in the operation of the winding-motor, a motor circuit having a contact controlled by said wheel, circuit-controlling mechanism operated by the spring-motor during the actuation of the record, and a reproducer-shifter actuated from said spring-motor, for the purpose set forth.

6. The combination with a phonograph having a spring-motor and a rotary record, of a winding-motor, controlling mechanism for the winding-motor actuated by the spring-motor, and a record-stop actuated by said controlling mechanism, for the purpose set forth.

7. The combination with a phonograph having a spring-motor and a rotary record, of a winding-motor, controlling mechanism for the winding-motor actuated by the spring-motor, and a record-stop thrown into the operative position during the operation of starting the winding-motor and thrown out of operative position before the winding-motor has completed its operation, for the purpose set forth.

8. The combination with a phonograph having a spring-motor and a rotary record, of a record-stop, an actuating lever therefor, a latch for said lever, and mechanism operated by the spring-motor and controlling said latch, for the purpose set forth.

9. The combination with a phonograph having a spring-motor and a rotary record, of a stop for the record, an actuating member for the stop, a latch for said actuating member, a pawl serving to retract said latch, a pawl-actuating member, and a wheel controlling the movement of said pawl-actuating member, for the purpose set forth.

10. The combination with a phonograph having a spring-motor and a rotary record, of a stop for the record, an actuating member for said stop, a rotary wheel controlling said actuating member, a reproducer-shifter, and means actuated by said wheel and serving to actuate said reproducer-shifter, for the purpose set forth.

11. The combination with a phonograph having a spring-motor and a rotary record, of an electric winding-motor, a circuit-controlling member, a wheel actuated by the spring-motor, a record-stop, and actuating means for the record-stop having interlocking connection with the circuit-controlling member, for the purpose set forth.

12. The combination with a phonograph having a rotary record and a projecting stop, of a vertically movable stop co-acting therewith, and an actuating lever connected with said vertically movable stop, for the purpose set forth.

13. The combination with a phonograph having a record, a reproducer co-acting with said record and a spring-motor to actuate the record, of a winding-motor, a reproducer shifter supported on a horizontal pivot extending transversely of the reproducer arm, a link connected therewith, and a controlling wheel actuated by the spring-motor and controlling the movements of said link.

HERBERT S. MILLS.

In presence of—
J. H. LANDES,
L. HEISLAR.